(12) United States Patent
Hasuka et al.

(10) Patent No.: US 10,079,555 B2
(45) Date of Patent: Sep. 18, 2018

(54) CONTROL METHOD FOR POLYPHASE STEP-UP CONVERTER, AND POLYPHASE STEP-UP CONVERTER

(71) Applicant: TOYOTA JIDOSHA KABUSHIKI KAISHA, Toyota-shi, Aichi-ken (JP)

(72) Inventors: Yoshinobu Hasuka, Toyota (JP); Kazuo Kajihata, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/447,781

(22) Filed: Mar. 2, 2017

(65) Prior Publication Data
US 2017/0257038 A1   Sep. 7, 2017

(30) Foreign Application Priority Data
Mar. 3, 2016 (JP) .................................. 2016-041486

(51) Int. Cl.
| | |
|---|---|
| *G05F 1/00* | (2006.01) |
| *H02M 7/44* | (2006.01) |
| *H02P 27/06* | (2006.01) |
| *H02M 1/084* | (2006.01) |

(52) U.S. Cl.
CPC .............. *H02M 7/44* (2013.01); *H02M 1/084* (2013.01); *H02P 27/06* (2013.01)

(58) Field of Classification Search
CPC ...... H02M 3/1584; H02M 7/08; H02M 1/084; H02M 1/0845; H02J 1/102
USPC ...................... 323/272; 363/65, 69
See application file for complete search history.

(56) References Cited

U.S. PATENT DOCUMENTS

| | | | |
|---|---|---|---|
| 2009/0066262 A1* | 3/2009 | Tateishi ................. | H02M 3/07 315/291 |
| 2011/0020720 A1* | 1/2011 | Chatroux ............ | H02M 3/1584 429/431 |
| 2014/0111172 A1* | 4/2014 | Sasao ................. | H02M 3/1588 323/271 |

FOREIGN PATENT DOCUMENTS

JP          2014-42410        3/2014

* cited by examiner

*Primary Examiner* — Alex Torres-Rivera
(74) *Attorney, Agent, or Firm* — Finnegan, Henderson, Farabow, Garrett & Dunner, LLP

(57) ABSTRACT

A control method for a polyphase step-up converter that drives step-up circuits, the step-up circuits being connected in parallel between an input terminal and an output terminal from which an output voltage supplied to a load circuit is output. The control method includes, in changing the frequency of each of driving signals from a first frequency to a second frequency while N circuits are being driven, determining whether the second frequency is M times as high as a resonance frequency of a resonance circuit provided between the polyphase step-up converter and the load circuit; and when the second frequency is M times as high as the resonance frequency, setting a phase difference between driving signals to a phase difference determined in accordance with a value of M.

2 Claims, 7 Drawing Sheets

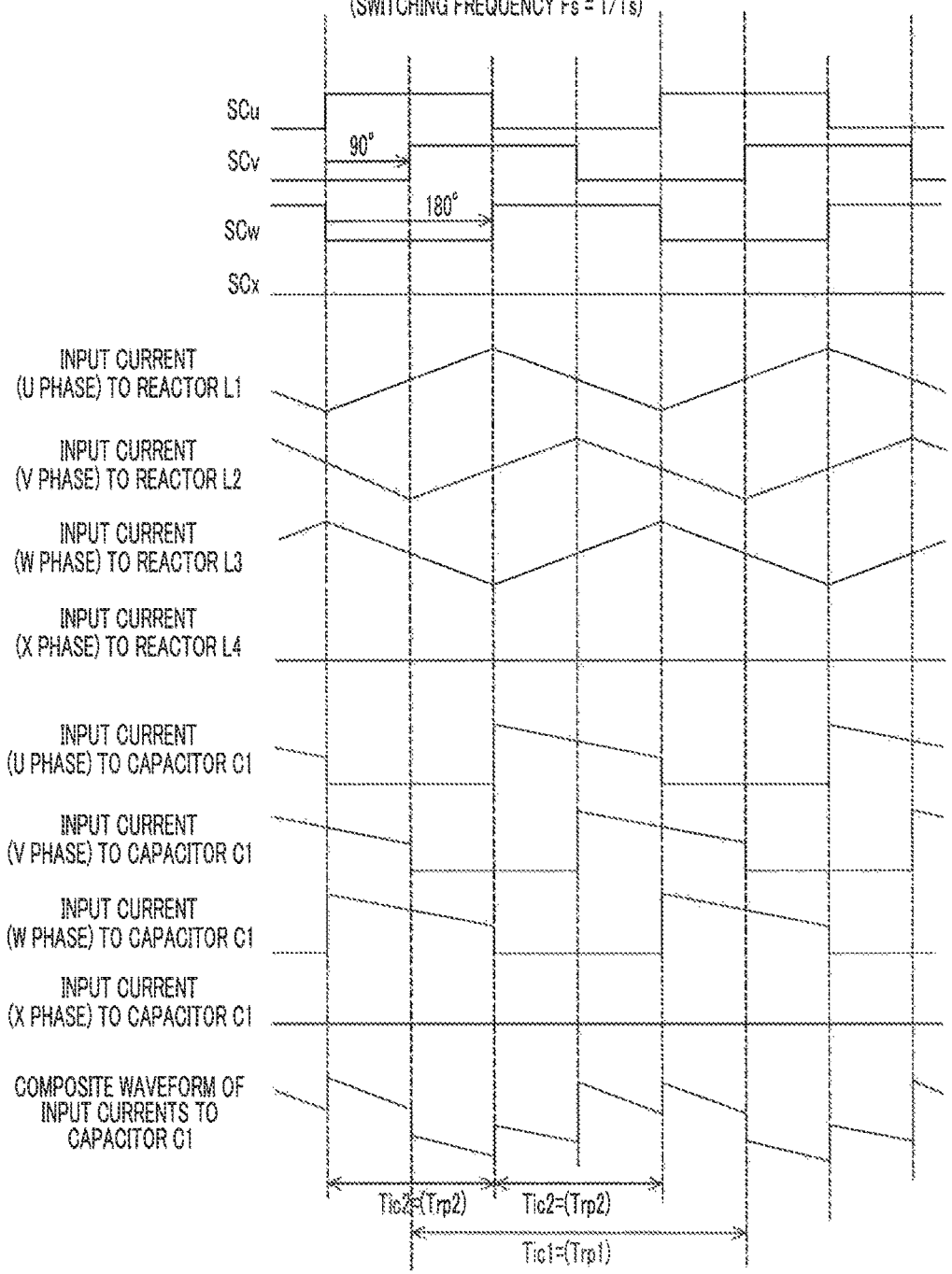

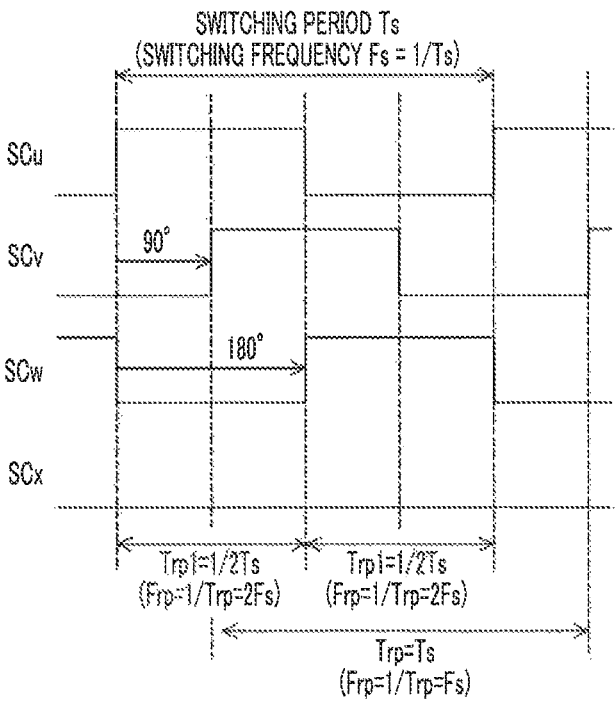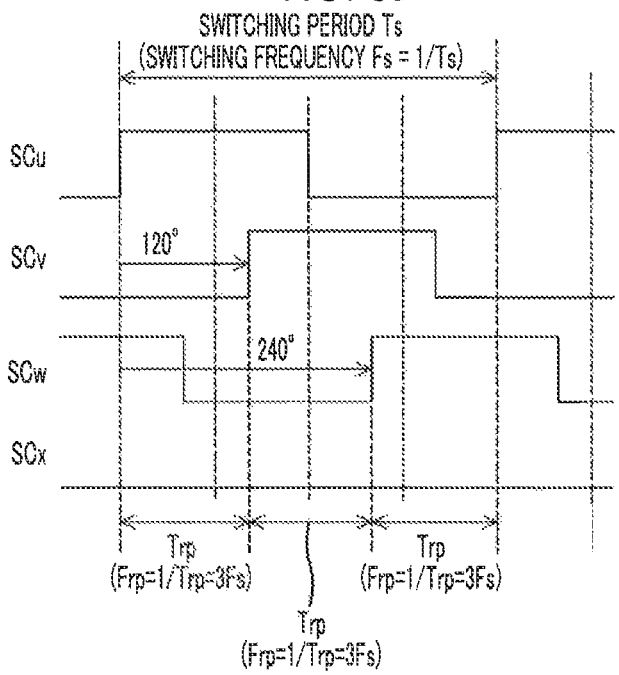

CONTROL METHOD FOR POLYPHASE STEP-UP CONVERTER, AND POLYPHASE STEP-UP CONVERTER

INCORPORATION BY REFERENCE

The disclosure of Japanese Patent Application No. 2016-041486 filed on Mar. 3, 2016 including the specification, drawings and abstract is incorporated herein by reference in its entirety.

BACKGROUND

1. Technical Field

The disclosure relates to a control method for a polyphase step-up converter, and the polyphase step-up converter. For example, the disclosure relates to a control method for a polyphase step-up converter that includes a plurality of step-up converters connected in parallel with each other and that controls the plurality of step-up converters with the use of a plurality of driving signals having different phases, and the polyphase step-up converter.

2. Description of Related Art

There is a polyphase step-up converter as one of step-up converters. The polyphase step-up converter includes a plurality of step-up converters connected in parallel with each other and controls the plurality of step-up converters with the use of a plurality of driving signals having different phases. The polyphase step-up converter is allowed to reduce a load per one phase at a high load as compared to a single-phase step-up converter, so a reduction in size is possible. An example of the polyphase step-up converter is described in Japanese Patent Application Publication No. 2014-042410 (JP 2014-042410 A).

The polyphase step-up converter described in JP 2014-042410 A includes a circuit in which a switch and a reactor are connected in parallel with each other between an output terminal of the polyphase step-up converter and a load circuit to which a stepped-up voltage generated by the polyphase step-up converter is supplied. In the polyphase step-up converter described in JP 2014-042410 A, the reactor is switched between an active state and an inactive state with the switch. Thus, the polyphase step-up converter described in JP 2014-042410 A avoids a resonance phenomenon that occurs as a result of coincidence of a ripple component of an output signal of the polyphase converter with a resonance frequency of a resonance circuit formed of a smoothing capacitor connected to the output terminal of the polyphase step-up converter and an inductor that parasitizes a wire connected to the output terminal.

However, the technique described in JP 2014-042410 A requires the circuit in which the switch and the inductor are connected in parallel with each other. Generally, an inductor has a large volume and weight. For this reason, when the resonance phenomenon of a system including a polyphase step-up converter is avoided with the technique described in JP 2014-042410 A, the volume and weight of the system are large.

SUMMARY

The disclosure avoids a resonance phenomenon while minimizing the volume and weight of a system including a polyphase step-up converter.

An aspect of the disclosure provides a control method for a polyphase step-up converter that drives a plurality of step-up circuits with the use of a plurality of driving signals having the same frequency, respectively, the plurality of step-up circuits being connected in parallel with each other between an input terminal to which an input voltage is applied and an output terminal from which an output voltage that is supplied to a load circuit is output. The control method includes: in changing the frequency of each of the plurality of driving signals from a first frequency to a second frequency while N (an integer larger than or equal to two) step-up circuits are being driven, determining whether the second frequency is M (a natural number smaller than or equal to N) times as high as a resonance frequency of a resonance circuit that is provided between the polyphase step-up converter and the load circuit; and, when the second frequency is M times as high as the resonance frequency, setting a phase difference between the plurality of driving signals to a phase difference that is determined in accordance with a value of M and at which a resonance phenomenon is avoided.

According to the above aspect, the phase difference between the plurality of driving signals is set to a phase difference that is determined in accordance with the value of M and at which a resonance phenomenon is avoided. Thus, with a system that uses the control method for a polyphase step-up converter according to the disclosure, it is possible to avoid occurrence of a resonance phenomenon in the system by setting the phase difference between the plurality of driving signals to an appropriate value without using an inductor for shifting the resonance frequency of the resonance circuit.

In the above aspect, where the number of the plurality of step-up circuits of the polyphase step-up converter is A (an integer larger than or equal to N), the phase difference that is determined in accordance with the value of M and at which the resonance phenomenon is avoided may be set by using values, obtained by dividing 360° by values ranging from two to the A, as choices.

With this configuration, it is possible to change the phase difference between the plurality of driving signals after the change of the frequency at high speed through processing with a small amount of calculation.

A second aspect of the disclosure provides a polyphase step-up converter. The polyphase step-up converter includes: a plurality of step-up circuits connected in parallel with each other between an input terminal to which an input voltage is applied and an output terminal from which an output voltage that is supplied to a load circuit is output; and a control unit configured to drive the plurality of step-up circuits with the use of a plurality of driving signals having the same frequency, respectively. The control unit is configured to, in changing the frequency of each of the plurality of driving signals from a first frequency to a second frequency while N (an integer larger than or equal to two) step-up circuits are being driven, determine whether the second frequency is M (a natural number smaller than or equal to N) times as high as a resonance frequency of a resonance circuit that is provided between the output terminal and the load circuit, and, when the second frequency is M times as high as the resonance frequency, set a phase difference between the plurality of driving signals to a phase difference that is determined in accordance with a value of M and at which the resonance phenomenon is avoided.

According to the above aspect of the disclosure, the phase difference between the plurality of driving signals is set to a phase difference that is determined in accordance with the value of M and at which a resonance phenomenon is avoided. Thus, with a system that uses the polyphase step-up converter according to the disclosure, it is possible to avoid occurrence of a resonance phenomenon in the system by setting the phase difference between the plurality of driving signals to an appropriate value without using an inductor for shifting the resonance frequency of the resonance circuit.

With the control method for a polyphase step-up converter and the polyphase step-up converter according to the disclosure, it is possible to avoid a resonance phenomenon while minimizing the volume and weight of the system.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a timing chart that shows an example of driving signals and currents that are input to capacitors in the polyphase step-up converter according to the first embodiment;

FIG. 3A and FIG. 3B are timing charts that illustrate a condition of occurrence of a resonance phenomenon in the system including the polyphase step-up converter according to the first embodiment;

DETAILED DESCRIPTION OF EMBODIMENTS

Figure 1:
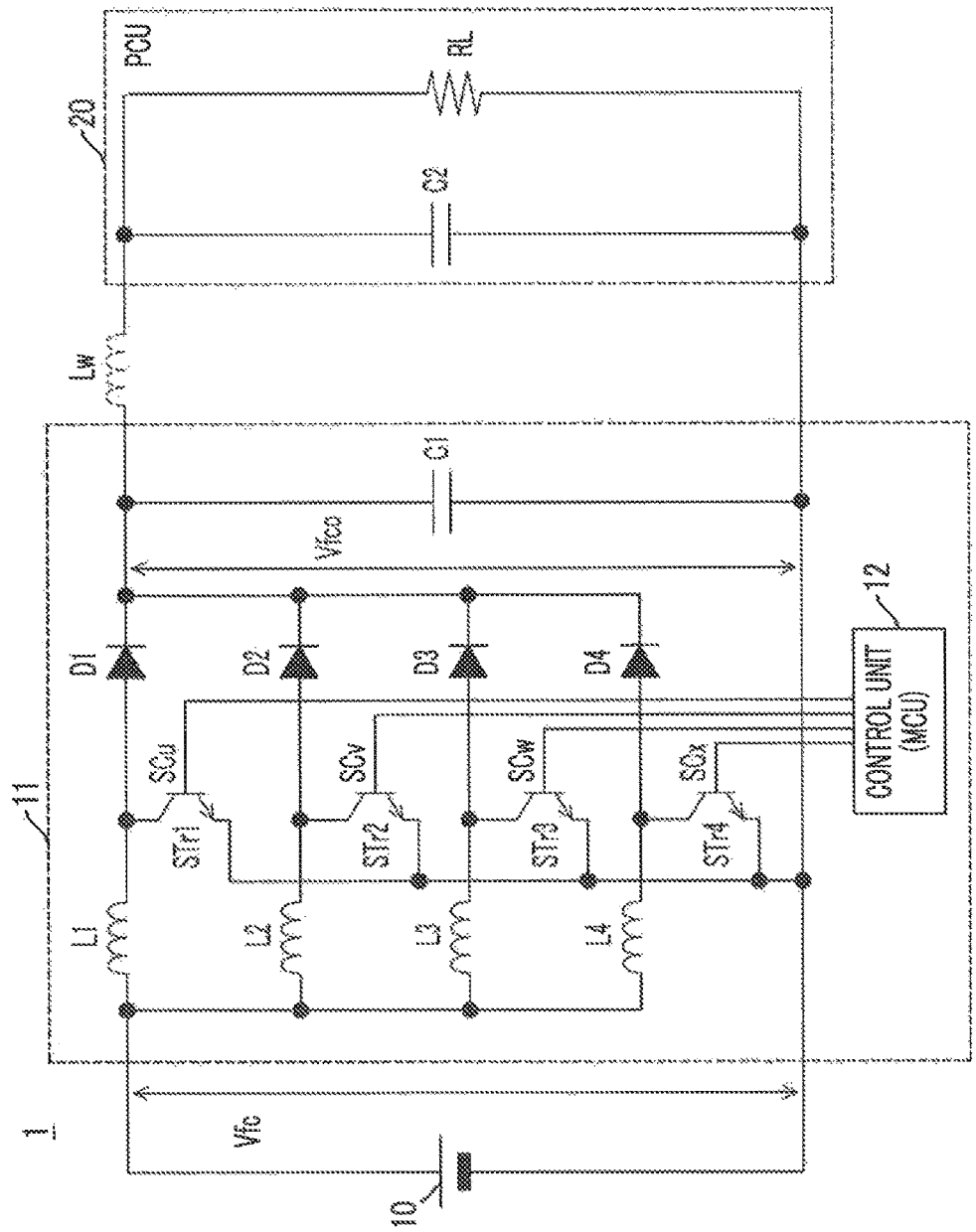
FIG. 1 is a block diagram of a system including a polyphase step-up converter according to a first embodiment.

Hereinafter, an embodiment of the disclosure will be described with reference to the accompanying drawings. For the sake of clear explanation, the following description and drawings are omitted or simplified as needed. In each drawing, like reference numerals denote the same components, and the overlap description is omitted where appropriate.

FIG. 1 shows the schematic view of a system 1 including a polyphase step-up converter according to a first embodiment. As shown in FIG. 1, the system 1 according to the first embodiment includes an input power supply 10, a polyphase step-up converter 11 and an electric power control unit 20. FIG. 1 shows a parasitic inductor Lw of a wire that connects the polyphase step-up converter 11 to the electric power control unit 20.

The input power supply 10 is, for example, a fuel cell. In the system 1, an output voltage Vfco is generated by stepping up an input voltage Vfc with the use of the polyphase step-up converter 11. The output voltage Vfco is applied to the electric power control unit 20. The input voltage Vfc is generated by the fuel cell 10. The polyphase step-up converter 11 is configured to drive a plurality of step-up circuits with the use of a plurality of driving signals having the same frequency. The plurality of step-up circuits are connected in parallel with each other between an input terminal and an output terminal. The input voltage is applied to the input terminal. The output voltage that is supplied to a load circuit is output from the output terminal. The electric power control unit 20 includes a step-up converter and an inverter. The step-up converter steps up an in-vehicle high-tension battery voltage to a system voltage. The inverter drives a motor by converting a direct-current voltage to an alternating-current voltage. The motor serves as a power source of a vehicle.

The polyphase step-up converter 11 includes reactors L1 to L4, diodes D1 to D4, driving transistors STr1 to STr4, a control unit 12 and a capacitor C1. The polyphase step-up converter 11 is a four-phase step-up converter, and includes four step-up circuits. Each of the four step-up circuits includes the reactor, the diode and the driving transistor. Of course, the number of phases of the polyphase step-up converter 11 (the number of step-up circuits of the polyphase step-up converter 11) is not limited to four, and may be two or more.

In the example shown in FIG. 1, one ends of the reactors L1 to L4 are connected to the input terminal of the polyphase step-up converter 11. The anode of the diode D1 is connected to the other end of the reactor L1, and the cathode of the diode D1 is connected to the output terminal of the polyphase step-up converter 11. The anode of the diode D2 is connected to the other end of the reactor L2, and the cathode of the diode D2 is connected to the output terminal of the polyphase step-up converter 11. The anode of the diode D3 is connected to the other end of the reactor L3, and the cathode of the diode D3 is connected to the output terminal of the polyphase step-up converter 11. The anode of the diode D4 is connected to the other end of the reactor L4, and the cathode of the diode D4 is connected to the output terminal of the polyphase step-up converter 11.

The collector of the driving transistor STr1 is connected between the reactor L1 and the diode D1, the emitter of the driving transistor STr1 is connected to a ground wire, and a U-phase driving signal SCu is applied to the base of the driving transistor STr1. The collector of the driving transistor STr2 is connected between the reactor L2 and the diode D2, the emitter of the driving transistor STr2 is connected to the ground wire, and a V-phase driving signal SCv is applied to the base of the driving transistor STr2. The collector of the driving transistor STr3 is connected between the reactor L3 and the diode D3, the emitter of the driving transistor STr3 is connected to the ground wire, and a W-phase driving signal SCw is applied to the base of the driving transistor STr3. The collector of the driving transistor STr4 is connected between the reactor L4 and the diode D4, the emitter of the driving transistor STr4 is connected to the ground wire, and an X-phase driving signal SCx is applied to the base of the driving transistor STr4.

In the system 1 according to the first embodiment, the capacitor C1 is arranged at the output terminal of the polyphase step-up converter 11, and the capacitor C2 is arranged at the input terminal of the electric power control unit 20. The capacitor C1 smoothes the output voltage of the polyphase step-up converter 11. The capacitor C2 is a bypass capacitor that reduces fluctuations in voltage that is applied to the electric power control unit 20 in response to a current that is consumed by the electric power control unit 20. In the system 1 according to the first embodiment, a resonance circuit is formed of the capacitors C1, C2 and the parasitic inductor Lw. The parasitic inductor Lw is the inductor of the wire that connects the polyphase step-up converter 11 to the electric power control unit 20. A resonance frequency Fr of the resonance circuit is expressed by the following mathematical expression (1).

$$Fr = \frac{1}{2\pi\sqrt{L \times \frac{C1+C2}{C1 \times C2}}} \quad (1)$$

In the mathematical expression (1), C1 denotes the capacitance of the capacitor C1, C2 denotes the capacitance of the capacitor C2, and L denotes the inductance of the parasitic inductor Lw.

The control unit 12 drives the plurality of step-up circuits with the use of the plurality of driving signals (for example, the driving signals SCu, SCv, SCw, SCx) having the same frequency. The control unit 12 changes the frequency of each driving signal while manipulating a phase difference between the driving signals such that a ripple frequency that occurs in the output voltage Vfco of the polyphase step-up converter 11 does not coincide with the resonance frequency Fr of the resonance circuit on the basis of the frequency of each of the plurality of driving signals that are output from the control unit 12 and the phase difference between the driving signals. Thus, it is possible to avoid a resonance phenomenon in the resonance circuit. Specific processes that are executed by the control unit 12 will be described later.

A condition for avoiding the resonance phenomenon in the resonance circuit will be described. Initially, the ripple frequency Frp will be described. FIG. 2 shows a timing chart that shows an example of driving signals and currents that are input to the capacitor in the polyphase step-up converter according to the first embodiment. The example shown in FIG. 2 is a timing chart in a state where three phases out of the four phases are being driven with a phase difference of 90° between the driving signals. As shown in FIG. 2, each driving circuit of the polyphase step-up converter 11 according to the first embodiment increases a charging current to the capacitor C1 in a period during which the corresponding driving signal is at a low level, and reduces the charging current to the capacitor C1 in a period during which the corresponding driving signal is at a high level. In the polyphase step-up converter 11, the capacitor C1 is charged by supplying the capacitor C1 with charging currents respectively having peaks at different phases with the use of the plurality of step-up circuits. In such a case, ripple fluctuations in the output voltage Vfco fluctuate in accordance with the peak of the composite waveform of the charging currents from the plurality of step-up circuits to the capacitor C1. For this reason, an occurrence period Tic1 of the peak of the charging currents is a ripple period Trp1. In the example shown in FIG. 2, the ripple period Trp1 is a ripple period that arises in accordance to one driving signal. A ripple period Trp2 is a ripple period that arises in accordance with driving signals between which the phase difference is 180°. The ripple frequency is allowed to be calculated as the inverse of the ripple period.

In the control unit 12, when the two or more driving circuits of the polyphase step-up converter 11 are operated, a condition is set for a phase difference between driving signals to be selected such that the ripple frequencies other than the ripple frequency that is calculated from the ripple period of one-phase driving signal out of the thus calculated plurality of ripple frequencies do not coincide with the resonance frequency Fr. The condition of the phase difference between the driving signals to be selected will be described below.

The condition of the phase difference between the driving signals to be selected is a condition that the ripple frequency Frp does not coincide with the resonance frequency Fr of the resonance circuit. As a result of diligent research of the inventors, the inventors found that the resonance phenomenon is avoided by setting the phase difference between the driving signals to any one of phase differences indicated by the following conditions I to IV. In the conditions I to IV, Fs denotes the switching frequency of each driving signal, Fr denotes the resonance frequency of the resonance circuit, N denotes the number of driven phases (which is the number of the step-up circuits to be driven and is an integer larger than or equal to two), B denotes the phase difference between the driving signals, and n denotes a resonance driving constant and is an integer smaller than the number of driven phases N and larger than or equal to two. In the case of the condition I Fr=Fs, B=360/N. In the case of the condition II Fr=Fs×N, B≠360/N. In the case of the condition III Fr=Fs×n, B=360/n and n phases out of the N phases are other than B. In the case of the condition IV Fr≠Fs or Fr≠Fs×N or Fr≠Fs×n, that is, Fr≠Fs×M (a natural number smaller than or equal to N), no resonance frequency occurs.

As shown in the above-described conditions I to III, a resonance phenomenon can occur when the resonance frequency Fr becomes M (M is a natural number smaller than or equal to N) times as high as the switching frequency Fs of each driving signal. On the other hand, as shown in the above-described condition IV, no resonance phenomenon can occur unless the resonance frequency Fr is M times as high as the switching frequency Fs of each driving signal.

For the sake of easy understanding, a specific example of the above-described conditions I to IV in the case where the polyphase step-up converter 11 is driven by three phases (that is, in the case of N=3) will be described.

As shown in the condition I, when the switching frequency Fs of each driving signal coincides with the resonance frequency Fr, that is, when Fs=Fr, the phase difference B between the three-phase driving signals is set to 360°/3=120°.

As shown in the condition II, when a threefold of the switching frequency Fs of each driving signal coincides with the resonance frequency Fr, that is, when Fr=Fs×N, the phase difference B between the three-phase driving signals is set to a phase difference other than 360°/3=120°.

As shown in the condition III, when a twofold of the switching frequency Fs of each driving signal coincides with the resonance frequency Fr, that is, when Fr=Fs×n (n=2), the phase difference B between the two-phase driving signals out of the three-phase driving signals is set to a phase difference other than 360°/2=180°.

In consideration of the above conditions, specific processes that are executed by the control unit 12 in order to avoid a situation that the ripple frequency coincides with the resonance frequency Fr (a resonance phenomenon occurs) will be described.

In changing the frequency of each driving signal from a first frequency to a second frequency while the N (an integer larger than or equal to two) step-up circuits are being driven, the control unit 12 executes a frequency determination step and a phase difference setting step.

In the frequency determination step, it is determined whether the second frequency is M (a natural number smaller than or equal to N) times as high as the resonance frequency Fr of the resonance circuit provided between the polyphase step-up converter 11 and the load circuit (for example, the electric power control unit 20). This is because, as described above, when the second frequency is M times as high as the resonance frequency, there is a possibility that the ripple frequency coincides with the resonance frequency Fr (a resonance phenomenon occurs).

Subsequently, in the phase difference setting step, when the second frequency is M times as high as the resonance frequency, the phase difference between the plurality of driving signals is set to a phase difference that is determined in accordance with the value of M and at which a resonance phenomenon is avoided (any one of the phase differences shown in the above-described conditions I to III).

Preferably, when the control unit 12 sets the phase difference between the plurality of driving signals, the control unit 12 changes the phase difference by using values, obtained by dividing 360° by values ranging from two to the value of A (which is the number of the step-up circuits included in the polyphase step-up converter 11 and is an integer larger than or equal to N), as choices of the phase difference between the plurality of driving signals. For example, when the number of the step-up circuits is four (that is, A=4), the phase difference between the driving signals is selected from among three choices, that is, 180° (=360°/2), 120° (=360°/3) and 90° (=360°/4).

The phase difference between the driving signals may be set to any value as long as a resonance phenomenon is avoided. However, by determining choices of the phase difference in advance in this way, the amount of calculation of the control unit 12, required to change the phase difference, is reduced, so it is possible to increase the rate at which the phase difference is changed.

Next, the operation of the polyphase step-up converter 11 according to the first embodiment will be described. First, a state where a resonance phenomenon occurs and a state where no resonance phenomenon occurs will be described on the basis of the frequency of each driving signal. FIG. 3A and FIG. 3B show timing charts that illustrate a condition of occurrence of a resonance phenomenon in the system including the polyphase step-up converter according to the first embodiment.

FIG. 3A is a timing chart in a state where a resonance phenomenon occurs. As shown in FIG. 3A, when the phase difference between the driving signals is 90°, the ripple frequency Frp that is calculated from the switching frequency Fs and the phase difference between the driving signals includes a frequency component (2Fr) twice as high as the resonance frequency Fr and a frequency component as high as the resonance frequency Fr. For this reason, there occurs a resonance phenomenon due to the ripple frequency Frp of the frequency component that coincides with the resonance frequency Fr.

FIG. 3B is a timing chart in a state where no resonance phenomenon occurs. As shown in FIG. 3B, when the phase difference between the driving signals is 120°, the ripple frequency Frp that is calculated from the switching frequency Fs and the phase difference between the driving signals includes only a frequency component (3Fr) three times as high as the resonance frequency Fr. For this reason, under the condition as shown in FIG. 3B, even when the switching frequency Fs coincides with the resonance frequency Fr, no resonance phenomenon occurs.

In the polyphase step-up converter 11 according to the first embodiment, in order to avoid a resonance phenomenon that occurs in the resonance circuit, the phase difference between the driving signals is changed by the control unit 12 in response to a change of the switching frequency Fs. A phase control method for the driving signals in the polyphase step-up converter 11 according to the first embodiment will be described below.

Figure 4:
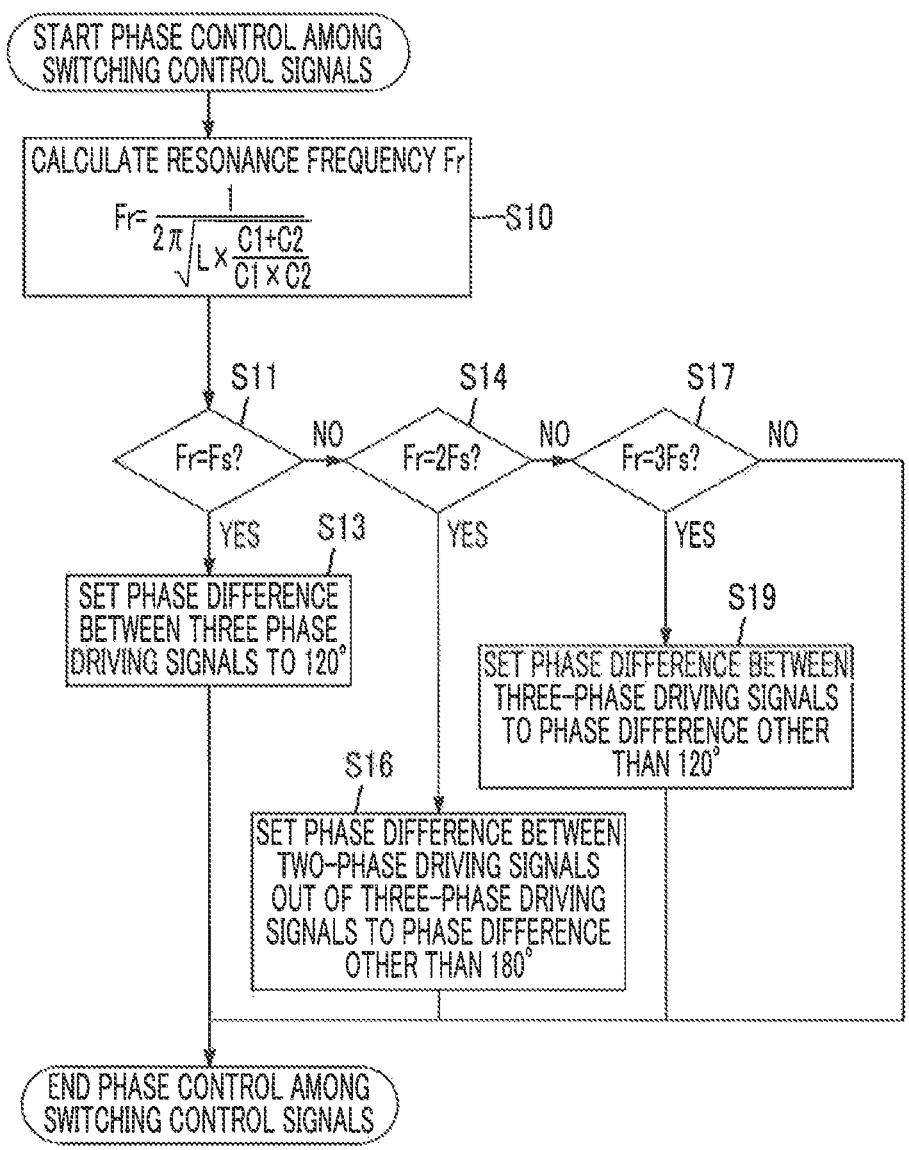
FIG. 4 is a flowchart of phase control over driving signals in the case where the polyphase step-up converter according to the first embodiment is controlled by three phases.

FIG. 4 shows a flowchart of phase control between the driving signals as a result of a change of the switching frequency Fs in the case where the polyphase step-up converter according to the first embodiment is driven by three phases. Processes based on the flowchart are executed in the control unit 12.

As shown in FIG. 4, the control unit 12 initially calculates the resonance frequency Fr (step S10). This calculation is performed by using the above-described mathematical expression (1). The resonance frequency Fr depends on the configuration of the system 1, so the resonance frequency Fr may be calculated in advance.

Subsequently, the control unit 12 executes the frequency determination step (step S11, step S14, step S17) and the phase difference setting step (step S13, step S16, step S19).

As described above, in the frequency determination step (step S11, step S14, step S17), in changing the frequency of each driving signal from the first frequency to the second frequency while the N (an integer larger than or equal to two) step-up circuits are being driven, it is determined whether the second frequency is M (a natural number smaller than or equal to N) times as high as the resonance frequency Fr of the resonance circuit provided between the polyphase step-up converter 11 and the load circuit (for example, the electric power control unit 20).

In the phase difference setting step (step S13, step S16, step S19), when the second frequency is M times as high as the resonance frequency, the phase difference between the plurality of driving signals is set to a phase difference that is determined in accordance with the value of M and at which a resonance phenomenon is avoided (any one of the phase differences shown in the above-described conditions I to III).

Specifically, after completion of step S10, the control unit 12 determines whether the changed switching frequency Fs of each driving signal coincides with the resonance frequency Fr (step S11). When it is determined in step S11 that the changed switching frequency Fs coincides with the resonance frequency Fr (the branch of YES in step S11), the control unit 12 sets the phase difference between the three-phase driving signals to 120° on the basis of the above-described condition I (step S13), and ends the process.

When it is determined in step S11 that the switching frequency Fs does not coincide with the resonance frequency Fr (the branch of NO in step S11), the control unit 12 determines whether a frequency twice as high as the switching frequency Fs coincides with the resonance frequency Fr (step S14). When it is determined in step S14 that the frequency twice as high as the switching frequency Fs coincides with the resonance frequency Fr (the branch of YES in step S14), the control unit 12 sets the phase difference between two-phase driving signals out of the three-phase driving signals to a phase difference other than 180° on the basis of the above-described condition III (step S16), and ends the process.

When it is determined in step S14 that the frequency twice as high as the switching frequency Fs does not coincide with the resonance frequency Fr (the branch of NO in step S14), the control unit 12 determines whether a frequency three times as high as the switching frequency Fs coincides with the resonance frequency Fr (step S17). When it is determined in step S17 that the frequency three times as high as the switching frequency Fs coincides with the resonance frequency Fr (the branch of YES in step S17), the control unit 12 sets the phase difference between the three-phase driving signals to a phase difference other than 120° on the basis of the above-described condition II (step S19), and ends the process. When it is determined in step S17 that the frequency three times as high as the switching frequency Fs does not coincide with the resonance frequency Fr (the branch of NO in step S17), the control unit 12 ends the process without changing the current phase difference between the driving signals.

The polyphase step-up converter 11 according to the first embodiment repeats step S11, step S13, step S14, step S16, step S17, step S19 each time the switching frequency Fs is changed.

Figure 5:
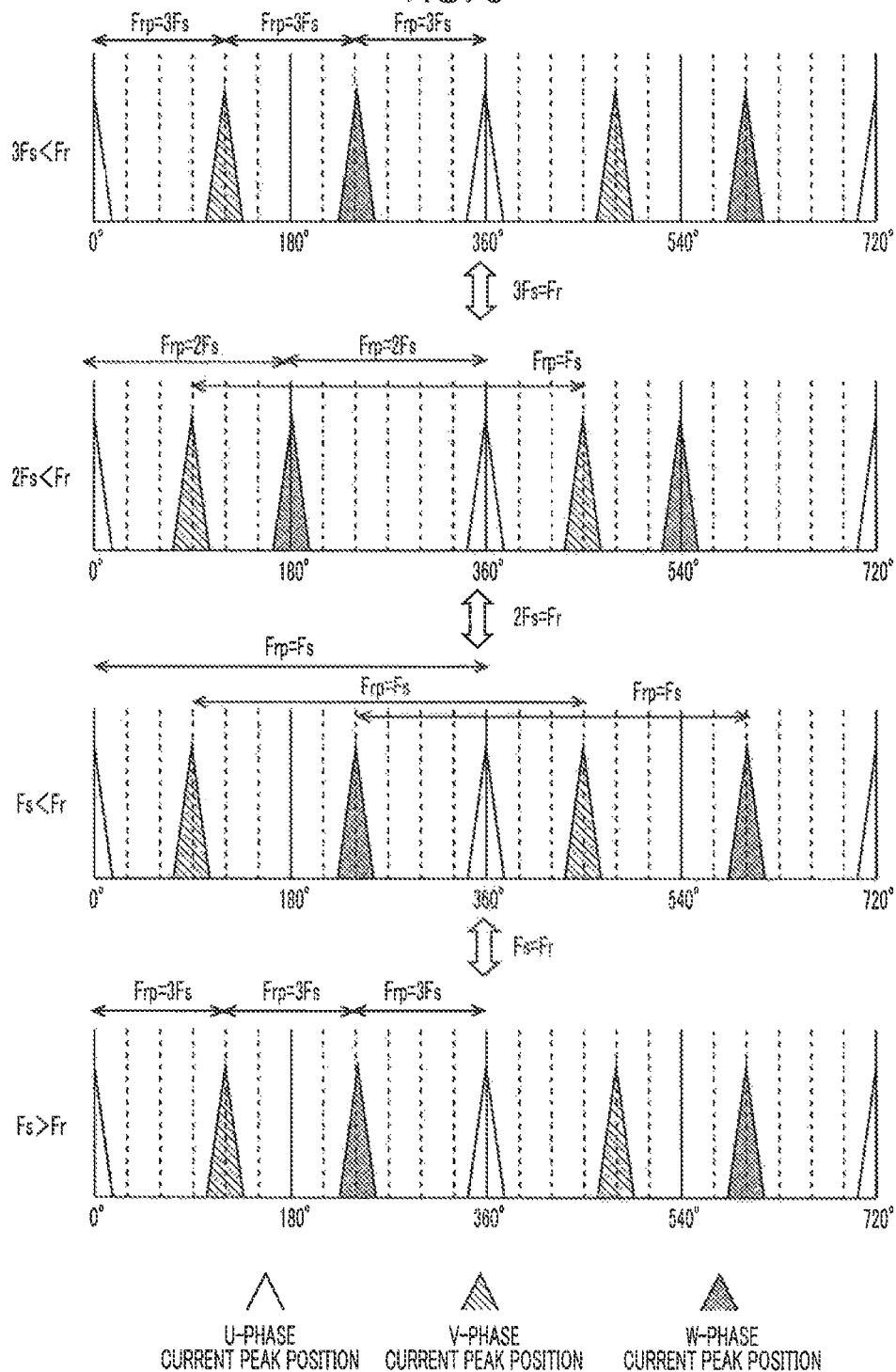
FIG. 5 is a timing chart that illustrates ripple frequencies in the case where the polyphase step-up converter according to the first embodiment is controlled by three phases.

In the polyphase step-up converter 11 according to the first embodiment, the phase difference between the driving signals is set in accordance with the flowchart shown in FIG. 4. This specific example will be described with reference to FIG. 5. FIG. 5 shows a timing chart that illustrates a ripple frequency in the case where the polyphase step-up converter according to the first embodiment is controlled by three phases. The example of setting a frequency, shown in FIG. 5, is an example of a mode of setting the phase difference. When the phase difference is set such that any one of the conditions I to IV is satisfied, a phase difference other than that in FIG. 5 may also be employed.

As shown in the top graph of FIG. 5, when the switching frequency Fs is lower than a third of the resonance frequency Fr (in the case of 3Fs<Fr), the polyphase step-up converter 11 according to the first embodiment operates while the phase difference between the driving signals is set to 120°. In this case, the ripple frequency Frp includes only a frequency component (3Fr) that is three times as high as the resonance frequency Fr.

As shown in the above-described condition II, as the switching frequency Fs reaches a third of the resonance frequency Fr (that is, when 3Fs=Fr), a resonance phenomenon occurs if the phase difference between the three-phase driving signals while the polyphase step-up converter 11 is being driven by three phases is 120° (=360°/3). For this reason, at the time when the frequency three times as high as the switching frequency Fs coincides with the resonance frequency Fr, the polyphase step-up converter 11 changes the phase difference between the driving signals.

Specifically, as shown in the second top graph in FIG. 5, when the switching frequency Fs is higher than or equal to a third of the resonance frequency Fr and is lower than a half of the resonance frequency Fr (when 2Fs<Fr), the polyphase step-up converter 11 operates while the phase difference between the U-phase and V-phase driving signals and the phase difference between the V-phase and W-phase driving signals are set to 90° and the phase difference between the W-phase and U-phase driving signals is set to 180°. In this case, the ripple frequency Frp includes a frequency component (2Fr) twice as high as the resonance frequency Fr and a frequency component as high as the resonance frequency Fr.

As shown in the above-described condition III, as the switching frequency Fs reaches a half of the resonance frequency Fr (that is, when 2Fs=Fr), a resonance phenomenon occurs if the phase difference between the two W-phase and U-phase driving signals while the polyphase step-up converter 11 is being driven by three phases is 180° (=360°/2). For this reason, at the time when the frequency twice as high as the switching frequency Fs coincides with the resonance frequency Fr, the polyphase step-up converter 11 changes the phase difference between the driving signals.

Specifically, as shown in the third top graph in FIG. 5, when the switching frequency Fs is higher than or equal to a half of the resonance frequency Fr and is lower than the resonance frequency Fr (when Fs<Fr), the polyphase step-up converter 11 operates while the phase difference between the U-phase and V-phase driving signals is set to 90°, the phase difference between the U-phase and W-phase driving signals is set to 240° and the phase difference between the W-phase and U-phase driving signals is set to 120°. In this case, the ripple frequency Frp includes only a frequency component as high as the resonance frequency Fr.

As shown in the above-described condition I, as the switching frequency Fs reaches the resonance frequency Fr (that is, when Fs=Fr), a resonance phenomenon occurs unless the phase difference between the three-phase driving signals while the polyphase step-up converter 11 is being driven is 120° (=360°/3). For this reason, at the time when the switching frequency Fs coincides with the resonance frequency Fr, the polyphase step-up converter 11 changes the phase difference between the driving signals.

Specifically, as shown in the bottom graph in FIG. 5, when the switching frequency Fs is higher than or equal to the resonance frequency Fr (when Fs≥Fr), the polyphase step-up converter 11 operates while the phase difference between the U-phase and V-phase driving signals, the phase difference between the V-phase and W-phase driving signals and the phase difference between the W-phase and U-phase driving signals are set to 120°.

Figure 6:
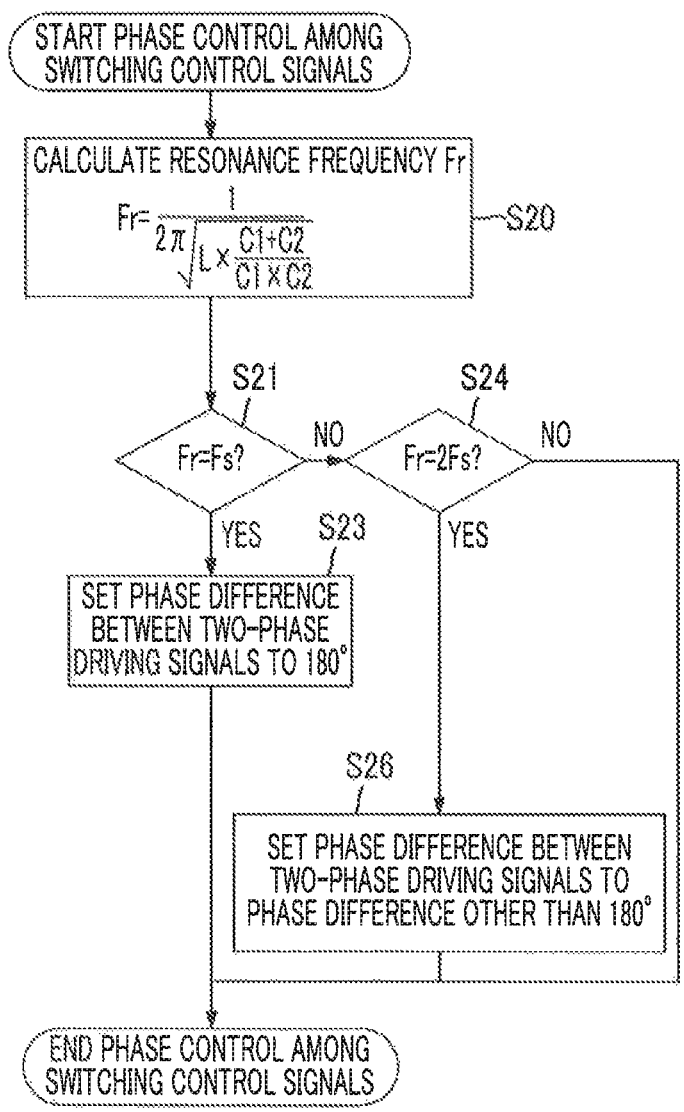
FIG. 6 is a flowchart of phase control over driving signals in the case where the polyphase step-up converter according to the first embodiment is controlled by two phases.

Next, the case where the polyphase step-up converter 11 is operated while being driven by two phases will be described. FIG. 6 shows a flowchart of phase control between driving signals in the case where the polyphase step-up converter according to the first embodiment is controlled by two phases.

As shown in FIG. 6, the control unit 12 initially calculates the resonance frequency Fr (step S20). This calculation is performed by using the above-described mathematical expression (1). The resonance frequency Fr depends on the configuration of the system 1, so the resonance frequency Fr may be calculated in advance.

Subsequently, the control unit 12 executes a frequency determination step (step S21, step S24) and a phase difference setting step (step S23, step S26).

Specifically, after completion of step S20, the control unit 12 determines whether the switching frequency Fs of each driving signal coincides with the resonance frequency Fr (step S21). When it is determined in step S21 that the changed switching frequency Fs coincides with the resonance frequency Fr (the branch of YES in step S21), the control unit 12 sets the phase difference between the two-phase driving signals to 180° on the basis of the above-described condition I (step S23), and ends the process.

When it is determined in step S21 that the switching frequency Fs does not coincide with the resonance frequency Fr (the branch of NO in step S21), the control unit 12 determines whether a frequency twice as high as the switching frequency Fs coincides with the resonance frequency Fr (step S24). When it is determined in step S24 that the frequency twice as high as the switching frequency Fs coincides with the resonance frequency Fr (the branch of YES in step S24), the control unit 12 sets the phase difference between the two-phase driving signals to a phase difference other than 180° on the basis of the above-described condition II (step S26), and ends the process. When it is determined in step S24 that the frequency twice as high as the switching frequency Fs does not coincide with the resonance frequency Fr (the branch of NO in step S24), the control unit 12 ends the process without changing the current phase difference between the driving signals.

The polyphase step-up converter 11 according to the first embodiment repeats step S21, step S23, step S24, step S26 each time the switching frequency Fs is changed.

Figure 7:
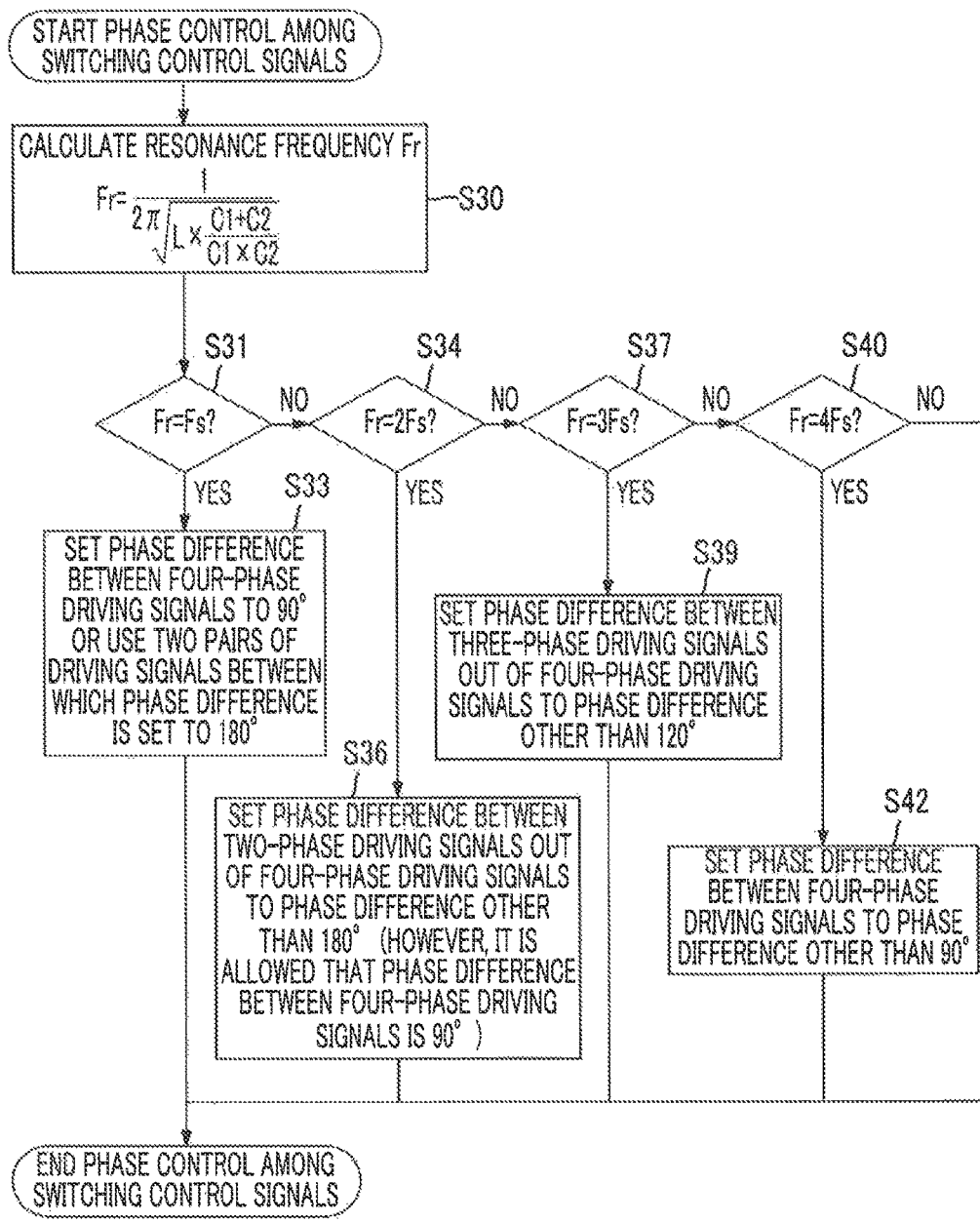
FIG. 7 is a flowchart of phase control over driving signals in the case where the polyphase step-up converter according to the first embodiment is controlled by four phases.

Next, the case where the polyphase step-up converter 11 is operated while being driven by four phases will be described. FIG. 7 shows a flowchart of phase control between driving signals in the case where the polyphase step-up converter according to the first embodiment is controlled by four phases.

As shown in FIG. 7, the control unit 12 initially calculates the resonance frequency Fr (step S30). This calculation is performed by using the above-described mathematical expression (1). The resonance frequency Fr depends on the configuration of the system 1, so the resonance frequency Fr may be calculated in advance.

Subsequently, the control unit 12 executes a frequency determination step (step S31, step S34, step S37, step S40) and a phase difference setting step (step S33, step S36, step S39, step S42).

Specifically, after completion of step S30, the control unit 12 determines whether the switching frequency Fs of each driving signal coincides with the resonance frequency Fr (step S31). When it is determined in step S31 that the changed switching frequency Fs coincides with the resonance frequency Fr (the branch of YES in step S31), the control unit 12 sets the phase difference between the four-phase driving signals to 90° or uses two pairs of driving signals between which the phase difference is set to 180° on the basis of the above-described condition I (step S33), and ends the process.

When it is determined in step S31 that the switching frequency Fs does not coincide with the resonance frequency Fr (the branch of NO in step S31), the control unit 12 determines whether a frequency twice as high as the switching frequency Fs coincides with the resonance frequency Fr (step S34). When it is determined in step S34 that the frequency twice as high as the switching frequency Fs coincides with the resonance frequency Fr (the branch of YES in step S34), the control unit 12 sets the phase difference between two-phase driving signals out of the four-phase driving signals to a phase difference other than 180° (however, it is allowed when the phase difference between the four-phase driving signals is 90°) on the basis of the above-described condition III (step S36), and ends the process.

When it is determined in step S34 that the frequency twice as high as the switching frequency Fs does not coincide with the resonance frequency Fr (the branch of NO in step S34), the control unit 12 determines whether a frequency three times as high as the switching frequency Fs coincides with the resonance frequency Fr (step S37). When it is determined in step S37 that the frequency three times as high as the switching frequency Fs coincides with the resonance frequency Fr (the branch of YES in step S37), the control unit 12 sets the phase difference between the three-phase driving signals out of the four-phase driving signals to a phase difference other than 120° on the basis of the above-described condition III (step S39), and ends the process.

When it is determined in step S37 that the frequency three times as high as the switching frequency Fs does not coincide with the resonance frequency Fr (the branch of NO in step S37), the control unit 12 determines whether a frequency four times as high as the switching frequency Fs coincides with the resonance frequency Fr (step S40). When it is determined in step S40 that the frequency four times as high as the switching frequency Fs coincides with the resonance frequency Fr (the branch of YES in step S40), the control unit 12 sets the phase difference between the four-phase driving signals to a phase difference other than 90° on the basis of the above-described condition II (step S42), and ends the process. When it is determined in step S40 that the frequency four times as high as the switching frequency Fs does not coincide with the resonance frequency Fr (the branch of NO in step S40), the control unit 12 ends the process without changing the current phase difference between the driving signals.

The polyphase step-up converter 11 according to the first embodiment repeats step S31, step S33, step S34, step S36, step S37, step S39, step S40, step S42 each time the switching frequency Fs is changed.

According to the above description, in the polyphase step-up converter 11 according to the first embodiment, when it is determined that a resonance phenomenon occurs as a result of coincidence of the ripple frequency superimposed on an output voltage on the basis of the switching frequency of each driving signal and the phase difference between the driving signals with the resonance frequency of the resonance circuit, the ripple frequency is shifted from the resonance frequency by changing the phase difference between the driving signals. Thus, the polyphase step-up converter 11 according to the first embodiment is able to avoid a resonance phenomenon that occurs in the resonance circuit without providing a circuit or element for shifting the resonance frequency in the resonance circuit. That is, with the use of the polyphase step-up converter 11 according to the first embodiment, it is possible to avoid a resonance phenomenon that occurs in the system without increasing the volume or weight of the system.

Particularly, in order to reduce the size of the polyphase step-up converter, it is effective to increase the switching frequency Fs of each driving signal. However, if the switching frequency is attempted to be made higher than the resonance frequency Fr of the resonance circuit that is provided in a path that connects the polyphase step-up converter 11 to the electric power control unit 20, an output voltage excessively increases unless a resonance phenomenon in the resonance circuit is avoided, so there is an inconvenience that measures for handling an increase in the output voltage are taken in the electric power control unit 20. For the above reasons, when the switching frequency is increased, there is a great significance of avoiding a resonance phenomenon of the resonance circuit while minimizing the volume and weight of the system.

The disclosure made by the inventors is specifically described above on the basis of the embodiment; however, the disclosure is not limited to the embodiment described above. Of course, various modifications are applicable without departing from the scope of the disclosure.

What is claimed is:

1. A control method for a polyphase step-up converter that drives a plurality of step-up circuits with the use of a plurality of driving signals having the same frequency, respectively, the plurality of step-up circuits being connected in parallel with each other between an input terminal to which an input voltage is applied and an output terminal from which an output voltage that is supplied to a load circuit is output, the control method comprising:

when changing the frequency of each of the plurality of driving signals from a first frequency to a second frequency Fs while N, which is an integer larger than or equal to two, step-up circuits are being driven, determining whether the second frequency Fs is M, which is a natural number smaller than or equal to N, times as high as a resonance frequency Fr of a resonance circuit that is provided between the polyphase step-up converter and the load circuit; and when the second frequency Fs is M times as high as the resonance frequency Fr, setting a phase difference B between the plurality of driving signals to a phase difference that is defined in the following Conditions I to III and at which a resonance phenomenon is avoided, Condition I: in a case where Fr=Fs, B=360/N, Condition II: in a case where Fr=Fs×N, B≠360/N, and Condition III: in a case where Fr=Fs×p, B=360/p and p phases out of N phases have another phase difference other than B, where p is an integer smaller than N.

2. A polyphase step-up converter comprising:

a plurality of step-up circuits connected in parallel with each other between an input terminal to which an input voltage is applied and an output terminal from which an output voltage that is supplied to a load circuit is output; and a controller configured to drive the plurality of step-up circuits with the use of a plurality of driving signals having the same frequency, respectively, wherein the controller is configured to, when changing the frequency of each of the plurality of driving signals from a first frequency to a second frequency Fs while N, which is an integer larger than or equal to two, step-up circuits are being driven, determine whether the second frequency Fs is M, which is a natural number smaller than or equal to N, times as high as a resonance frequency Fr of a resonance circuit that is provided between the output terminal and the load circuit, and, when the second frequency Fs is M times as high as the resonance frequency Fr, set a phase difference B between the plurality of driving signals to a phase difference that is defined in the following Conditions I to III and at which a resonance phenomenon is avoided, Condition I: in a case where Fr=Fs, B=360/N.

Condition II: in a case where Fr=Fs×N, B≠360/N, and

Condition III: in a case where Fr=Fs×p, B=360/p and p phases out of N phases have another phase difference other than B, where p is an integer smaller than N.

* * * * *